United States Patent [19]

Carrow

[11] 4,106,745
[45] Aug. 15, 1978

[54] APPARATUS FOR ATTACHING AN INSERT IN A MOLD

[75] Inventor: Guy E. Carrow, Bartlesville, Okla.

[73] Assignee: Phillips Petroleum Company, Bartlesville, Okla.

[21] Appl. No.: 564,090

[22] Filed: Apr. 1, 1975

Related U.S. Application Data

[63] Continuation-in-part of Ser. No. 357,662, May 7, 1973, abandoned.

[51] Int. Cl.² ............................................ B22D 19/00
[52] U.S. Cl. .................................... 249/97; 264/275; 264/278; 269/254 CS
[58] Field of Search ........................ 249/91, 93, 94, 95, 249/96, 97, 83; 425/DIG. 38, DIG. 57, DIG. 127; 52/698, 699, 247; 264/261, 271, 274, 275, 277, 278; 164/112, 332, 333, 334; 269/49

[56] References Cited

U.S. PATENT DOCUMENTS

| 636,464 | 11/1899 | Snyder | 249/83 X |
|---|---|---|---|
| 1,515,002 | 11/1924 | Watkins | 249/88 |
| 1,882,755 | 10/1932 | Boynton | 164/111 |
| 2,245,257 | 6/1941 | Crumrine | 264/278 X |
| 2,523,603 | 9/1950 | Tuggle | 164/340 X |
| 3,231,646 | 1/1966 | Conder | 264/261 X |
| 3,238,287 | 3/1966 | Chapman | 264/278 X |
| 3,430,681 | 3/1969 | Smith | 164/112 X |
| 3,769,774 | 11/1973 | Barnes | 52/698 |

Primary Examiner—Francis S. Husar
Assistant Examiner—John S. Brown

[57] ABSTRACT

An insert that is to be embedded in a molded object is attached inside the mold in a resilient manner so that stresses caused in the area of the molded article surrounding the insert due to shifting of the molded article during cooling can be minimized.

3 Claims, 3 Drawing Figures

APPARATUS FOR ATTACHING AN INSERT IN A MOLD

This application is a continuation-in-part of my copending application having Ser. No. 357,662 filed May 7, 1973, now abandoned.

This invention relates to molding articles that are to contain an insert embedded therein. In another aspect it relates to an apparatus for attaching the insert to the mold so that the insert will become embedded in the molded article.

In the molding of articles as by rotational or other molding there is frequently need to encompass an insert in the final molded article. For example, in the production of containers or tanks there is frequently molded integral with the object a pouring spout or discharge nozzle or even a mounting bolt or stud. Thus, tanks or containers of sizes up to several hundred gallons capacity are molded with inserts as herein described. One skilled in the art in possession of this disclosure having studied the same will at once recognize that the invention has wide applicability to the molding of objects having inserts therein which are embedded within the molded object at the time of its molding.

When inserts are firmly attached to the inside of a mold and then embedded in a molded article it has been noted that upon the cooling of the molded article there is a tendency for undesirable stresses to develop in the molded article in the area surrounding the embedded insert. This undesirable development of stresses is thought to result due to the shifting or contraction of the molded article relative to the mold walls.

It is an object of this invention to produce a molded article having an insert therein. It is another object of this invention to provide a method for producing a molded object having an insert therein. It is a further object of this invention to provide a method and means by which the development of undesirable stresses in the area of the insert during cooling is minimized. It is a still further object of the invention to provide an apparatus for attaching an insert to a mold so that said insert can be embedded in the molded object, which apparatus functions to avoid the formation and retention of stresses in the object molded to encompass said insert.

Other aspects, concepts, objects, and the several advantages of the invention are apparent from a study of this disclosure, the drawing and the appended claims.

According to this invention the insert to be embedded in the molded object is resiliently and movably mounted inside the mold in such a manner that it will be correctly positioned during molding but will be able to shift in response to the shifting or contraction of the molded article upon cooling. This invention is applicable to any conventionally known molding technique in which an insert is to be embedded inside a molded article where the molded article is likely to shift or contract during cooling and thus cause the formation of stress points around the insert.

The invention is particularly applicable to rotationally molding of parts, particularly large parts, and those cases in which regardless of how molded more than one insert is to be occluded in the molded object when the molded article is likely to contract or shift during cooling. In those molding operations where several inserts are to be embedded the formation of stress points in the areas of the inserts which have been firmly affixed has been found to be even more pronounced. While some techniques can be more readily adapted to utilization of the invention than others, the essence of this invention can be applied to any known molding techniques. As noted, one embodiment is particularly useful for the technique known as rotational molding. However, the essence of the invention can also be applied to vacuum-forming, blow-molding and other methods now known in the art.

In the molding of such thermoplastics as polyolefin plastics, particularly Marlex (a registered trademark) plastics, for example, Marlex CL-100 (a registered trademark), which is a crosslinkable high density polyethylene particularly suited to rotational molding, as described in "Technical Information on Marlex ® Polyolefin Plastics," Sales Service Laboratory, Phillips Petroleum Company, Bartlesville, Okla., Bulletin No. 17, entitled "Rotational Molding", the method and apparatus of this invention can and does aid materially to relieve stresses which otherwise could cause stress cracking or warpage, especially in the area of the insert.

An insert can be broadly described as any material or object which is to be encompassed within a portion of the molded article when it has been molded. Thus an insert can be a protuberance such as a bolt or a tubular opening which extends outwardly from the molded and finished article or part for attachment of supporting straps, inlet or outlet of fluids, gauges, sending units to indicate the level of liquid in a tank, drains and drain plugs, electrical connections, etc. The insert can also be of such character or shapes that it is embedded in the molded article and does not extend substantially or appreciably therefrom. For example, the insert could be a flat ring that is embedded in the molded article in such a manner that something else could be attached to it after the molded article was formed.

The inserts in most instances will be of metal such as bronze, steel, aluminum, etc., but can also importantly be a material other than metal such as a plastic or thermoplastic with a higher melting point than that which it is molded and the temperature at which it is molded. An insert can be simply a polymer, e.g., a polyolefin having a higher melting point than another polyolefin being molded.

The method and apparatus of mounting the insert can be applied to the molding of various metals such as aluminum, or foamed aluminum, or other foamed metals, plastics including particularly thermoplastics or any other materials from which molded articles are molded and which can be molded to encompass inserts therein as herein described.

While ordinarily flexible or resilient rubber articles can be molded without undue stress formation which may lead to stress cracking there are hard rubber or similar hard articles which when molded to include inserts will develop stresses. The invention is applicable to such materials also. In accordance with this invention an insert is attached to the mold by a spring means in such a manner that it will be held in its proper position during molding but will be able to shift in any direction in response to the shifting or contraction of the molded article during the cooling of the article. If the insert is of sufficient length, the attaching of the insert involves extending the insert through a hole in the wall of the mold which will be described in more detail shortly. The portion of the insert that extends outside the mold wall is then attached to a spring means in such a manner that the insert is positioned at its proper location inside the mold. Thus, in its simplest form when this invention's apparatus is assembled the insert is suspended in the correct location in the mold by a spring located on the outside of the mold. In order to obtain the maximum minimization of stress the hole in the mold wall is preferably of such size that the insert extending therethrough will have sufficient freedom of movement to move laterally as well as axially in response to shifting or contracting of the molded article which will occur as it cools. The optimum size hole for a particular insert can be determined by routine testings of the strength of molded articles prepared using holes of different sizes.

Whenever the insert is of such character or shape that it is to be included in the molded article but not extend substantially or appreciably therefrom as in the case of a flat ring to which it is planned later to attach a filler neck or drain pipe, then, according to the invention, the insert can be temporarily attached to an extension which will extend outside the mold wall so that it can be attached to the spring means as described above.

A clear understanding of this invention will follow from a consideration of the specific embodiments illustrated in FIGS. 1–3.

Figure 1:
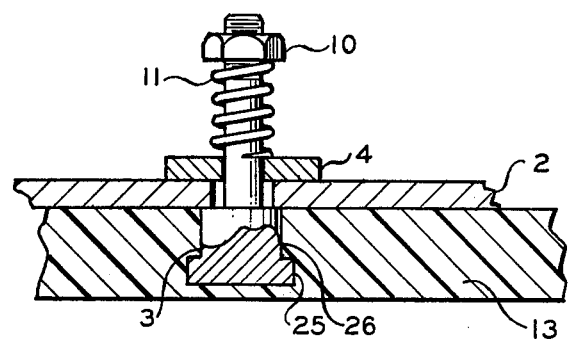
FIG. 1 is a partial cross-sectional view of one embodiment of the present invention.

In the embodiment illustrated a portion of the mold and article wall are shown in partial cross section by FIG. 1, 2 is the mold wall, 3 is an insert of the type which has a threaded protuberance which extends outside the mold wall. The portion of the insert 3 extending inside the mold wall has a larger portion 25 and smaller diameter portion 26. Thus, insert 3 is representative of a so-called mounting insert, an insert which when embedded in the molded article extends outside the article such that a support bracket or other service equipment can be attached to it. It should be evident that if the insert were of the type hereinbefore described which was not intended to extend outside the molded article or was one that was not long enough to extend outside the mold wall that an extension could be attached to make it function as the insert here illustrated.

In FIG. 1 the portion of the molded article which encompasses the lower portion of the insert 3 is represented by 13. On the end of the insert 3 that extends outside the mold wall 2 there is located a spring 11, such as an inconel spring. The spring 11 is prevented from passing through the hole in the mold wall by a washer-like means 4. On the threaded end of the insert 3 is placed a nut 10 of such size that the spring 11 cannot pass over it. This nut 10 is positioned on the insert such that the insert is held at its correct location inside the mold by the bias of spring 11. Once the apparatus is thus in position the molding may be accomplished. Once the molded article 13 has been shaped and cooling has begun the insert 3 will be able to shift in response to shifting and contraction of the molded article. The larger diameter portion 25 and smaller diameter portion 26 of insert 3 serve to position the insert 3 in its correct transverse position. The portion of the insert extending through the hole is free to move through the walls of the hole in the mold wall in the directions required by contraction during cooling of the molded article.

Figure 2:
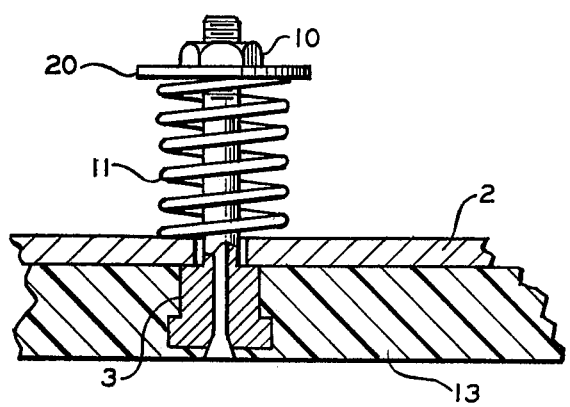
FIG. 2 is a partial cross section of another embodiment of the present invention.

In the embodiment set forth in FIG. 2 a portion of the mold and article wall are shown in partial cross section and differ from that in FIG. 1 in that a spring 11 is used that is large enough that there is no possibility for it to pass through the hole in the mold wall. Of course the use of such a larger diameter spring makes it necessary to employ a washer-like means 20 to insure that the spring 11 is kept between the nut 10 and the mold wall 2. The insert 3 of FIG. 2 is illustrated as hollow for use as a drain or filler opening or can be solid as in FIG. 1.

Figure 3:
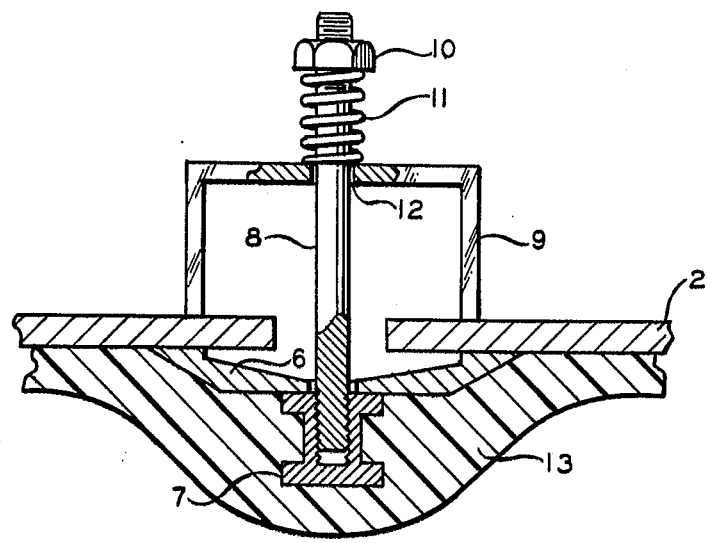
FIG. 3 is a partial cross-sectional view of still another embodiment of the present invention.

The embodiment set forth in FIG. 3 is particularly useful for rotational molding techniques in which the mold does not remain stationary during the molding process. In FIG. 3 the insert is represented by the "H"-shaped internally threaded member 7. This is representative of a typical insert which is not intended to extend outside the finished molded article. Since the insert 7 is not long enough to extend outside the mold wall an insert extension 8 is attached to the insert 7. Instead of the washer-like means employed in FIG. 1, the embodiment here illustrated employs a support bridge means 9, which permits the use of a shorter spring on the insert extension. The support bridge means 9 may be either firmly attached to the mold wall 2 or may be movable as was the washer in the first described embodiment. If the support bridge is firmly attached lto the mold wall the hole 12 where the extension 8 passes through the bridge 9 must be sufficiently large to insure that the extension will be able to undergo sufficient lateral movement to respond to shifts during the cooling of the molded article. The spring 11 is located on the insert extension 8 between the support bridge 9 and the nut 10.

Between the insert 7 and the inside of the mold wall the insert extension passes through a backing plate 6 which will prevent the insert from passing through the hole in the mold wall. The backing plate is such that when the nut 10 is tightened the insert 7 is held in contact with the backing plate by the force of the spring 11. The nut 10 can be adjusted so that the insert will remain in its proper position during rotational molding but so that it will also be able to move in response to the stresses caused by the shifting and contracting of the molded article as it cools. If desired, the tension on the spring 11 can even be reduced during the cooling step to further insure that only minimum stress will be formed in the molded article.

It should be evident that if the insert 7 is large enough that it cannot pass through the hole in the mold wall the backup plate could be dispensed with. Likewise, it should be evident that a similar embodiment would result if the insert embedded were one which would extend outside the mold wall. The essence of the embodiment set forth in FIG. 3 is that the insert is spring biasly clamped against the inside wall of the mold in the position in which it is to be embedded in the molded article and that the force of the clamping is such that the insert can respond to forces caused by the shifting or contraction of the cooling molded article. Thus, it would be within the scope of the invention to disperse with the support bridge and to use instead a spring attachment means such as that shown in FIGS. 1 and 2. That is, one could use a washer-like means between the mold wall and the spring as in FIG. 1 or a large spring as shown in FIG. 2. Any of these variations and modifications would be suitable for resiliently positioning an insert for rotational molding in such a manner that the insert would be free to move. In this manner stresses that could occur if the insert were firmly attached will be prevented.

It is to be understood that the foregoing specific examples are given as illustrations to enable those skilled in the art to understand and practice this invention.

Illustrative details are not intended to be construed as limitations on the invention. Obvious modifications and variations of this invention will be within the scope of the following claims.

I claim:

1. An apparatus for molding an object that is to have an insert embedded therein comprising an insert, a mold having a hole in the mold wall where said insert is to be positioned, an extension of said insert extending through said hole to the exterior of the mold when said insert is in its proper position within the mold, a spring means attached to the part of said extension which extends outside the mold wall such that said insert is spring biasly held in its correct position within the mold, said hole in said mold wall being of sufficient size with respect to the portion of said extension extending through said hole in said mold wall to allow the insert to have sufficient freedom of movement to move laterally as well as axially in response to shifting or contracting of the molded object which will occur during cooling of the molded object, and wherein said insert is smaller than the hole in the mold wall and at least a portion of said insert is prevented from passing through the mold wall by a washer-like means located between the insert and the interior of the mold.

2. An apparatus according to claim 1 wherein said washer-like means and said insert cooperate to block off said hole in said mold wall.

3. An apparatus for molding an object that is to have an insert embedded therein comprising a mold having a hole extending through the mold wall where said insert is to be positioned, an insert inside said mold, a spring support bridge having a hole therethrough, said spring support bridge being positioned on the exterior surface of the mold over said hole in said mold wall, an extension of said insert extending through and beyond both said hole in said mold wall and said hole in said spring support bridge, a coil spring placed around a portion of said extension which extends beyond the hole in said spring support bridge, a fastening means located on the end of the portion of said extension that extends beyond the hole in said spring support bridge which means secures said coil spring around said extension in such a fashion that said insert is spring biasly held in its correct position within the mold, wherein said hole in said mold wall is of sufficient size with respect to the portion of said insert extending through said hole in said mold wall to allow the insert to have sufficient freedom of movement to move laterally as well as axially in response to shifting or contracting of the molded object which will occur during cooling of the molded object, and wherein said insert is smaller than said hole in the mold wall and at least a portion of said insert is prevented from passing through the mold wall by a washer-like means located between said insert portion and the interior of said mold wall, and wherein said washer-like means and said insert cooperate to block off said hole in said mold wall.

* * * * *